(12) United States Patent
Saito et al.

(10) Patent No.: US 8,950,190 B2
(45) Date of Patent: Feb. 10, 2015

(54) GAS TURBINE COMBUSTOR HAVING CONTRACTION MEMBER ON INNER WALL SURFACE

(75) Inventors: Keijiro Saito, Tokyo (JP); Shinji Akamatsu, Tokyo (JP); Kenji Sato, Tokyo (JP); Shigemi Mandai, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 248 days.

(21) Appl. No.: 13/388,204

(22) PCT Filed: Nov. 5, 2010

(86) PCT No.: PCT/JP2010/069740
§ 371 (c)(1),
(2), (4) Date: Jan. 31, 2012

(87) PCT Pub. No.: WO2011/058931
PCT Pub. Date: May 19, 2011

(65) Prior Publication Data
US 2012/0125006 A1  May 24, 2012

(30) Foreign Application Priority Data
Nov. 10, 2009  (JP) .................. 2009-257360

(51) Int. Cl.
*F23R 3/06* (2006.01)
*F23R 3/46* (2006.01)
(Continued)

(52) U.S. Cl.
CPC ... *F23R 3/06* (2013.01); *F23R 3/46* (2013.01);
*F23R 3/16* (2013.01); *F23R 3/42* (2013.01);
*F02C 7/18* (2013.01); *F23R 2900/03045* (2013.01)
USPC .............................. 60/752; 60/754

(58) Field of Classification Search
CPC ............... F23R 3/16; F23R 3/42; F23R 3/06;
F23R 3/46; F23R 2900/03045; F02C 7/18
USPC .................................... 60/752–760
See application file for complete search history.

(56) References Cited

U.S. PATENT DOCUMENTS 2,564,497 A * 8/1951 Navias ............................ 431/356
2,840,989 A * 7/1958 Macaulay ....................... 60/756
(Continued)

FOREIGN PATENT DOCUMENTS

CN  85107191 A  9/1986
CN  1160150 A  9/1997
(Continued)

OTHER PUBLICATIONS

International Search Report of PCT/JP2010/069740, mailing date Feb. 1, 2011.
(Continued)

*Primary Examiner* — William H Rodriguez
*Assistant Examiner* — Carlos A Rivera
(74) *Attorney, Agent, or Firm* — Westerman, Hattori, Daniels & Adrian, LLP

(57) ABSTRACT

In a gas turbine combustor and a gas turbine, an air passage (54) that supplies combustion high-pressure air, a pilot nozzle (44), a main fuel nozzle (45), and a top hat nozzle (47) that supply fuel, and openings (64) that supply film air (cooling air) are provided with respect to a combustor inner cylinder (42), and contraction members (71, 72, and 73) are arranged along a circumferential direction on an inner wall surface in a downstream of a flow direction of combustion gas in the inner cylinder (42). The contraction members (71, 72, and 73) are provided in a predetermined area in the circumferential direction excluding penetrating portions (74, 75, and 76), which do not disturb the flow of cooling air, thereby enabling to suppress generation of carbon monoxide and the like and to suppress the occurrence of unstable combustion.

6 Claims, 7 Drawing Sheets

(51) Int. Cl.
  *F23R 3/16* (2006.01)
  *F23R 3/42* (2006.01)
  *F02C 7/18* (2006.01)

(56) References Cited

U.S. PATENT DOCUMENTS

| | | | | |
|---|---|---|---|---|
| 2,844,001 A * | 7/1958 | Alford | | 138/40 |
| 4,170,110 A * | 10/1979 | Radin | | 60/204 |
| 5,518,311 A * | 5/1996 | Althaus et al. | | 366/181.5 |
| 5,626,017 A * | 5/1997 | Sattelmayer | | 60/723 |
| 5,735,126 A | 4/1998 | Schulte-Werning | | |
| 5,850,732 A | 12/1998 | Willis et al. | | |
| 5,894,720 A | 4/1999 | Willis et al. | | |
| 6,016,658 A | 1/2000 | Willis et al. | | |
| 7,441,409 B2 * | 10/2008 | Patel et al. | | 60/752 |
| 7,748,352 B2 * | 7/2010 | Zajac | | 123/68 |
| 7,856,830 B2 * | 12/2010 | Alkabie | | 60/804 |
| 2009/0260364 A1* | 10/2009 | Keller et al. | | 60/753 |

FOREIGN PATENT DOCUMENTS

| | | |
|---|---|---|
| CN | 1590734 A | 3/2005 |
| CN | 1626877 A | 6/2005 |
| CN | 101029742 A | 9/2007 |
| FR | 1135017 A | 4/1957 |
| GB | 637223 A | 5/1950 |
| GB | 2212607 A | 7/1989 |
| JP | 32-001654 B1 | 3/1957 |
| JP | 61-39266 U | 3/1986 |
| JP | 05-149543 A | 6/1993 |
| JP | 9-014603 A | 1/1997 |
| JP | 10-311539 A | 11/1998 |
| JP | 2003-343839 A | 12/2003 |

OTHER PUBLICATIONS

Written Opinion of PCT/JP2010/069740, mailing date Feb. 1, 2011.
Chinese Office Action dated Sep. 26, 2013, issued in corresponding Chinese Patent Application No. 201080034079.X with English translation (20 pages).
Korean Notice of Allowance dated Apr. 29, 2014, issued in corresponding Korean Patent Application No. 10-2012-7002579 with Partial English translation (3 pages).
Notification on the Grant of Patent Right for invention in the Chinese Patent Application No. 201080034079.X dated Aug. 14, 2014; w/English Translation. (4 pages).
Extended European Search Report dated Nov. 5, 2014, issued in corresponding European Application No. 10829890.2. (5 pages).

* cited by examiner

GAS TURBINE COMBUSTOR HAVING CONTRACTION MEMBER ON INNER WALL SURFACE

FIELD

The present invention relates to a gas turbine combustor that supplies fuel to compressed gas and mixes the fuel with the compressed gas, and burns the mixed gas to obtain combustion gas, and to a gas turbine that drives a turbine by combustion gas from the gas turbine combustor to obtain rotational power.

BACKGROUND

For example, a gas turbine includes a compressor, a combustor, and a turbine. Air is taken in from an air inlet and compressed by a compressor, and then the air becomes high-temperature and high-pressure compressed air. In the combustor, fuel is supplied to the compressed air to burn the fuel, so that high-temperature and high-pressure combustion gas is obtained. The turbine is then driven by the combustion gas to drive a generator connected to the turbine.

In such a gas turbine combustor, in order to prevent flashback and burnout of wall surfaces, outside air is taken in from an external wall of a combustion chamber positioned near an apical end of a premixing nozzle, and the taken outside air flows along an inner wall surface of the combustion chamber as film air. However, the film air cools the combustion gas quickly in a part-load operation area of the gas turbine in which the temperature of the combustion gas in the combustor is low. Therefore, the timing of burning fuel gas (for example, methane) to cause a chemical reaction from carbon monoxide (CO) to carbon dioxide ($CO_2$) is delayed, and carbon monoxide and unburned hydrocarbon (UHC) may be generated in a large quantity.

As a technique for solving such a problem, for example, there is a technique described in Patent Literature 1 mentioned below. In a gas turbine combustor described in Patent Literature 1, a ring-shaped contraction member in a frusto-conical shape is mounted concentrically on an inner cylinder wall at the back of the combustor. Therefore, film air flows toward a central part by the contraction member and is mixed with high-temperature combustion gas to promote a combustion reaction, thereby enabling to suppress generation of carbon monoxide and unburned hydrocarbon.

CITATION LIST

Patent Literature

Patent Literature 1: Japanese Patent Application Laid-open No. H05-149543

SUMMARY

Technical Problem

In the conventional gas turbine combustor described above, in a part-load operation area of the gas turbine in which the temperature of combustion gas in the combustor is low, film air is mixed with high-temperature combustion gas by the contraction member to promote a combustion reaction, thereby enabling to suppress generation of carbon monoxide and unburned hydrocarbon. However, in a rated-load operation area of the gas turbine in which the temperature of combustion gas is high, swirl generated by the contraction member may excessively promote a combustion reaction, and thus unstable combustion may occur due to the instability of the swirl itself.

The present invention has been achieved to solve the above problems, and an object of the present invention is to provide a gas turbine combustor and a gas turbine that can suppress generation of carbon monoxide and suppress the occurrence of unstable combustion.

Solution to Problem

According to an aspect of the present invention, a gas turbine combustor includes: a combustion chamber in which high-pressure air and fuel are burned to generate combustion gas; a combustion high-pressure-air supplying unit that supplies combustion high-pressure air to the combustion chamber; a fuel supplying unit that supplies fuel to high-temperature air in the combustion chamber; a cooling-air supplying unit that supplies cooling air to the combustion chamber along an inner wall surface thereof; and a contraction member arranged along a circumferential direction on an inner wall surface in a downstream of a flow direction of combustion gas in the combustion chamber. The contraction member is provided in a predetermined area in a circumferential direction excluding penetrating portions, which do not disturb flow of cooling air.

In the gas turbine combustor, the contraction member is divided in plural through the penetrating portions and arranged in a circumferential direction.

In the gas turbine combustor, the contraction members are provided at asymmetric positions with respect to a circumferential direction on the inner wall surface of the combustion chamber.

In the gas turbine combustor, the contraction member has a corner portion protruding toward a central part of the combustion chamber.

In the gas turbine combustor, the contraction member is provided in plural in a flow direction of combustion gas.

According to another aspect of the present invention, a gas turbine supplies fuel to compressed air compressed by a compressor to burn fuel in a combustor, and supplies generated combustion gas to a turbine to obtain rotational power. The combustor includes a combustion chamber, a combustion high-pressure-air supplying unit that supplies combustion high-pressure air to the combustion chamber, a fuel supplying unit that supplies fuel to high-temperature air in the combustion chamber, a cooling-air supplying unit that supplies cooling air to the combustion chamber along an inner wall surface thereof, and a contraction member arranged along a circumferential direction on an inner wall surface in a downstream of a flow direction of combustion gas in the combustion chamber. The contraction member is provided in a predetermined area in a circumferential direction excluding penetrating portions, which do not disturb flow of cooling air.

Advantageous Effects of Invention

According to the gas turbine combustor of the present invention, there are provided a combustion high-pressure-air supplying unit that supplies combustion high-pressure air to a combustion chamber, a fuel supplying unit that supplies fuel to high-temperature air in the combustion chamber, a cooling-air supplying unit that supplies cooling air to the combustion chamber along an inner wall surface, and a contraction member arranged along a circumferential direction on the inner wall surface in a downstream of a flow direction of combustion gas in the combustion chamber. The contraction member is provided in a predetermined area in the circumferential direction excluding penetrating portions, which do not disturb the flow of cooling air. Accordingly, in an area where the contraction member is provided in the combustion chamber, the flow of cooling air is disturbed by the contraction member so that cooling air flows toward a central part. Furthermore, cooling air that flows in from a downstream of the contraction member is also disturbed by the disturbance caused by the contraction member. Therefore, cooling air is mixed with high-temperature combustion gas to promote a combustion reaction, thereby enabling to suppress generation of carbon monoxide and unburned hydrocarbon. On the other hand, in an area where the penetrating portions are provided, the flow of cooling air is not disturbed and cooling air flows along the inner wall surface. Accordingly, abnormal combustion of unburned premixed gas can be prevented, and the instability of swirl can be avoided by the presence of the penetrating portions. As a result, generation of unstable combustion can be suppressed.

According to the gas turbine combustor of the present invention, because the contraction member is divided in plural through penetrating portions and arranged in a circumferential direction, combustion is not excessively promoted in the penetrating portions, thereby enabling to suppress generation of unstable combustion.

According to the gas turbine combustor of the present invention, because the contraction members are provided at asymmetric positions with respect to the circumferential direction on the inner wall surface of the combustion chamber, a flame pattern becomes unbalanced with respect to the circumferential direction. Therefore, the temperature distribution in the circumferential direction in the combustion chamber changes, and thus an excitation force that generates unstable vibration in an axial direction can be reduced.

According to the gas turbine combustor of the present invention, because corner portions protruding toward a central part of the combustion chamber are provided in the contraction member, cooling air generates swirl at the corner portions of the contraction member, thereby enabling to promote mixing of combustion gas and cooling air.

According to the gas turbine combustor of the present invention, because a plurality of contraction members are arranged in the flow direction of combustion gas, heat generation by the contraction members can be dispersed, and generation of carbon monoxide and unburned hydrocarbon can be suppressed.

Furthermore, according to the gas turbine of the present invention, the gas turbine includes a compressor, a combustor, and a turbine, and as the combustor, a combustion high-pressure-air supplying unit that supplies combustion high-pressure air to a combustion chamber, a fuel supplying unit that supplies fuel to high-temperature air in the combustion chamber, a cooling-air supplying unit that supplies cooling air to the combustion chamber along an inner wall surface, and a contraction member arranged along a circumferential direction on the inner wall surface in a downstream of a flow direction of combustion gas in the combustion chamber are provided. The contraction member is provided in a predetermined area in the circumferential direction excluding penetrating portions, which do not disturb the flow of cooling air. Accordingly, in an area where the contraction member is provided in the combustion chamber, the flow of cooling air is disturbed by the contraction member so that cooling air flows toward a central part. Furthermore, a mixing promotion effect by the disturbance can be expected with respect to cooling air flowing in from a downstream of the contraction member. Therefore, cooling air is mixed with high-temperature combustion gas to promote a combustion reaction, thereby enabling to suppress generation of carbon monoxide and unburned hydrocarbon. On the other hand, in an area where the penetrating portions are provided, the flow of cooling air is not disturbed and cooling air flows along the inner wall surface. Accordingly, abnormal combustion of unburned premixed gas can be prevented, and the instability of swirl can be avoided by the presence of the penetrating portions. As a result, generation of unstable combustion can be suppressed.

DESCRIPTION OF EMBODIMENTS

Exemplary embodiments of a gas turbine combustor and a gas turbine according to the present invention will be explained below in detail with reference to the accompanying drawings. The present invention is not limited to the embodiments.

First Embodiment

Figure 1:
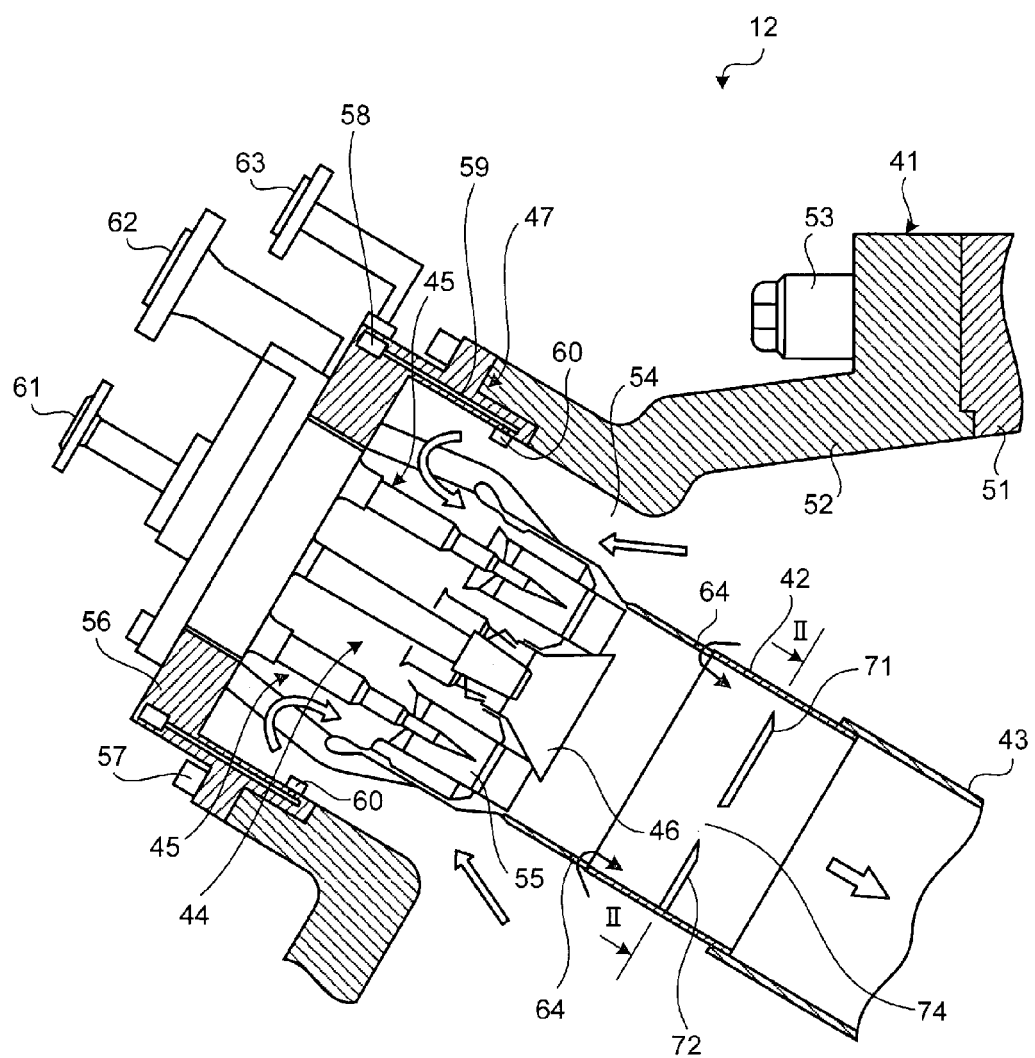
FIG. 1 is a schematic diagram of inside of a transition piece in a gas turbine combustor according to a first embodiment of the present invention.
Figure 2:
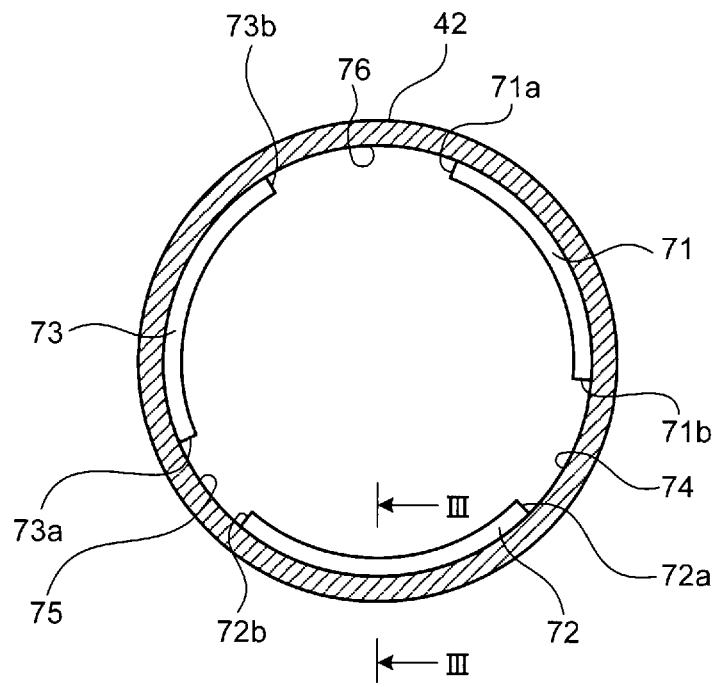
FIG. 2 is a cross-sectional view along a line II-II in FIG. 1.
Figure 3:
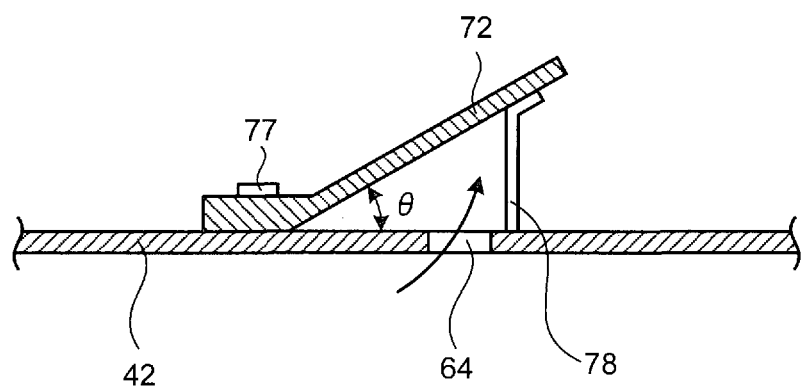
FIG. 3 is a cross-sectional view along a line III-III in FIG. 2.
Figure 4:
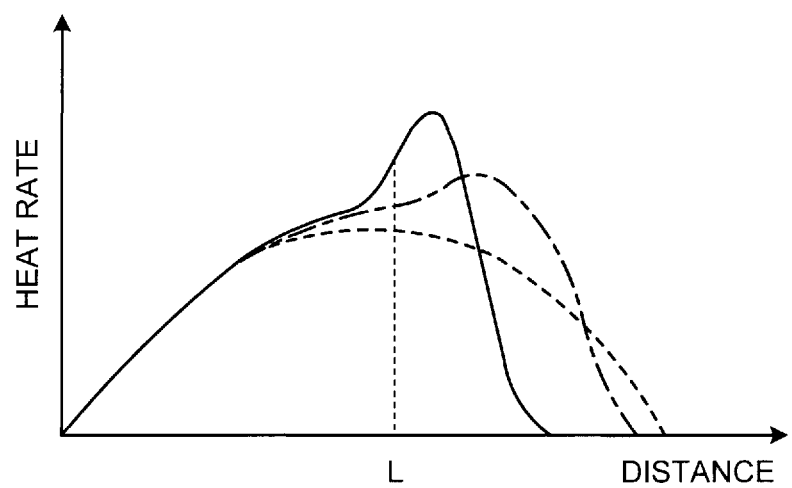
FIG. 4 is a graph representing a heat rate at an axial-direction position in the gas turbine combustor according to the first embodiment.
Figure 5:
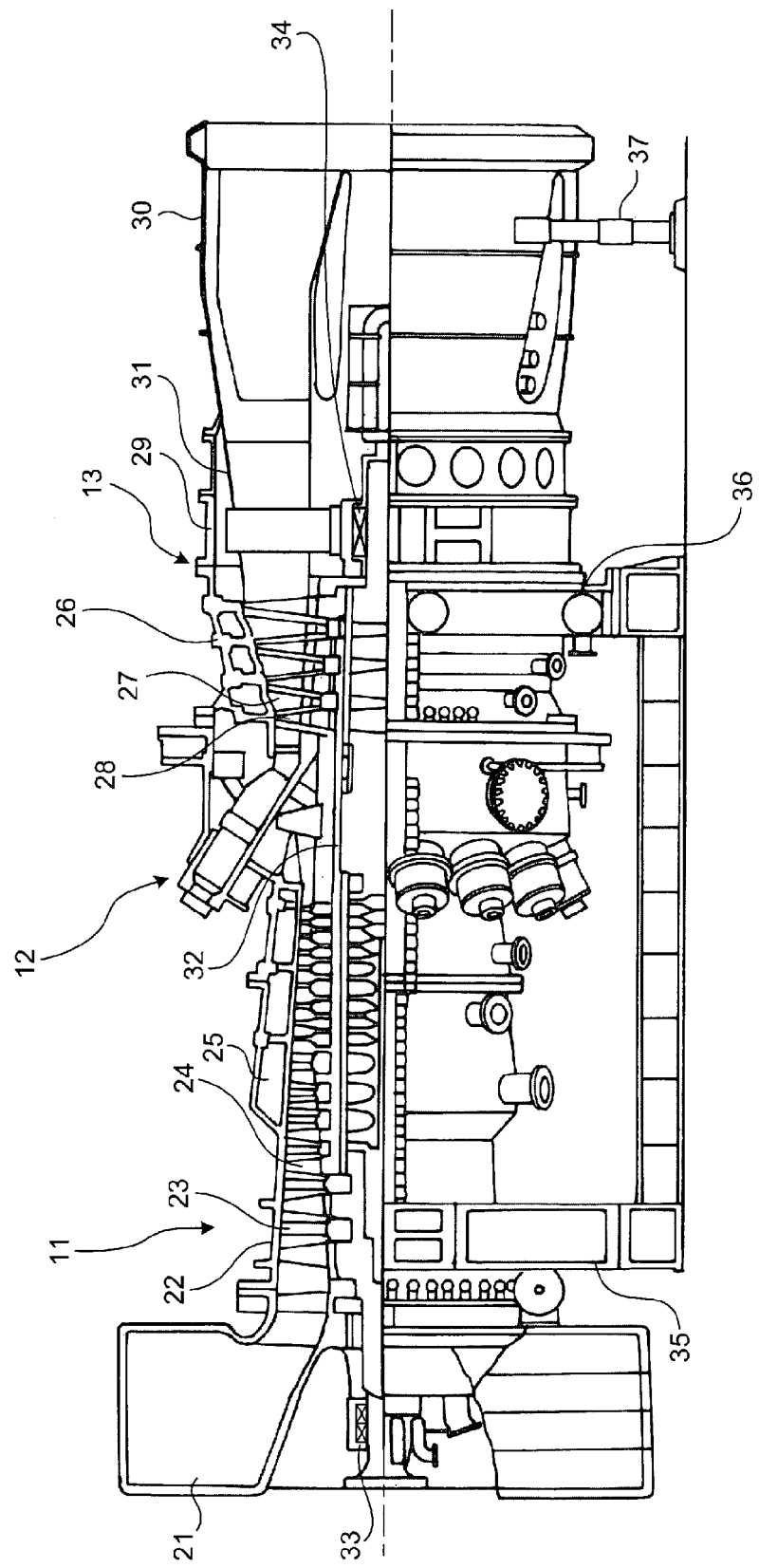
FIG. 5 is a schematic diagram of a gas turbine according to the first embodiment.

FIG. 1 is a schematic diagram of inside of a transition piece in a gas turbine combustor according to a first embodiment of the present invention, FIG. 2 is a cross-sectional view along a line II-II in FIG. 1, FIG. 3 is a cross-sectional view along a line III-III in FIG. 2, FIG. 4 is a graph representing a heat rate at an axial-direction position in the gas turbine combustor according to the first embodiment, and FIG. 5 is a schematic diagram of a gas turbine according to the first embodiment.

As shown in FIG. 5, the gas turbine according to the first embodiment includes a compressor 11, a combustor 12, and a turbine 13. A generator (not shown) is connected to the gas turbine 13 so that power can be generated.

The compressor 11 includes an air inlet 21 that takes in air, and in the compressor 11, a plurality of compressor vanes 23 and rotor blades 24 are arranged alternately in a longitudinal direction (an axial direction of a rotor 32 described later) in a compressor casing 22, and a bleed air chamber 25 is provided outside thereof. The combustor 12 supplies fuel to compressed air compressed by the compressor 11 to burn fuel by ignition. In the turbine 13, a plurality of nozzles 27 and rotor blades 28 are arranged alternately in the longitudinal direction (the axial direction of the rotor 32 described later) in a turbine casing 26. An exhaust chamber 30 is arranged on a downstream side of the turbine casing 26 through penetrating portions an exhaust casing 29, and the exhaust chamber 30 includes an exhaust diffuser 31 connected to the turbine 13.

The rotor (turbine shaft) 32 is positioned to penetrate the center of the compressor 11, the combustor 12, the turbine 13, and the exhaust chamber 30. An end of the rotor 32 on a side of the compressor 11 is rotatably supported by a bearing 33, and the other end on a side of the exhaust chamber 30 is rotatably supported by a bearing 34. A plurality of disks on which the respective rotor blades 24 are mounted are overlapped and fixed to the rotor 32 in the compressor 11, and a plurality of disks on which the respective rotor blade 28 are mounted are overlapped and fixed to the rotor 32 in the turbine 13. A drive shaft of a generator (not shown) is connected to the end of the rotor 32 on a side of the exhaust chamber 30.

In the gas turbine, the compressor casing 22 of the compressor 11 is supported by a leg 35, the turbine casing 26 of the turbine 13 is supported by a leg 36, and the exhaust chamber 30 is supported by a leg 37.

Accordingly, air taken in from the air inlet 21 of the compressor 11 is compressed while passing through the compressor vanes 23 and the rotor blades 24 so as to become high-temperature and high-pressure compressed air. In the combustor 12, predetermined fuel is supplied to the compressed air to burn. High-temperature and high-pressure combustion gas, which is a working fluid generated by the combustor 12, passes through the nozzles 27 and the rotor blades 28 that constitute the turbine 13 to rotate the rotor 32, thereby driving the generator connected to the rotor 32. Meanwhile, the energy of flue gas (combustion gas) is converted to a pressure by the exhaust diffuser 31 in the exhaust chamber 30, and is decelerated and discharged to the atmosphere.

In the combustor 12 according to the first embodiment described above, as shown in FIG. 1, an inner cylinder 42 is supported in an outer casing 41 with a predetermined gap, and a transition piece 43 is connected to an apical end of the inner cylinder 42 to constitute a combustor casing. A pilot nozzle 44 is arranged at the center of the inner cylinder 42, and a plurality of main fuel nozzles (premixing nozzles) 45 are arranged to surround the pilot nozzle 44 on an inner periphery of the inner cylinder 42 in a circumferential direction thereof. A pilot cone 46 is mounted on an apical end of the pilot nozzle 44. A plurality of top hat nozzles 47 are arranged on an inner periphery of the outer casing 41 along the circumferential direction thereof.

More specifically, an outer casing lid 52 is attached firmly to a base end of an outer casing body 51 and fastened by a plurality of fastening bolts 53 to constitute the outer casing 41. A base end of the inner cylinder 42 is fitted to the outer casing lid 52 so as to form an air passage 54 between the outer casing lid 52 and the inner cylinder 42. In the inner cylinder 42, the pilot nozzle 44 is arranged at the center of the inner cylinder 42, the main fuel nozzles 45 are arranged to surround the pilot nozzle 44, and the apical ends of the respective main fuel nozzles 45 are connected to a main burner 55.

A top hat part 56 is fitted to the outer casing lid 52 and is fastened by a plurality of fastening bolts 57. The top hat nozzle 47 described above is provided in the top hat part 56. That is, a fuel cavity 58 is formed in a base end of the top hat part 56 along the circumferential direction, a plurality of fuel passages 59 are formed from the fuel cavity 58 toward the apical end, and an injection port 60 is connected to an apical end of each of the fuel passages 59.

A pilot fuel line (not shown) is then connected to a fuel port 61 of the pilot nozzle 44, a main fuel line is connected to a fuel port 62 of the main fuel nozzle 45, and a top-hat fuel line is connected to a fuel port 63 of the top hat nozzle 47.

Furthermore, there are formed a plurality of openings 64 that take in high-pressure air from outside and cool the high-pressure air by causing the high-pressure air to flow along the inner periphery of the inner cylinder 42 as film air on an outer periphery of the inner cylinder 42.

In the first embodiment, a combustion chamber of the present invention is constituted by the inner cylinder 42 and the transition piece 43, a combustion high-pressure-air supplying unit is constituted by the air passage 54, a fuel supplying unit according to the present invention is constituted by the pilot nozzle 44, the main fuel nozzle 45, and the top hat nozzle 47, and a cooling-air supplying unit according to the present invention is constituted by the openings 64.

Accordingly, when airflow of high-temperature and high-pressure compressed air flows into the air passage 54, the compressed air is mixed with fuel injected from the top hat nozzle 47, and an air-fuel mixture flows into the inner cylinder 42. In the inner cylinder 42, the air-fuel mixture is mixed with fuel injected from the main fuel nozzle 45 by the main burner 55, and becomes a swirling current of premixed gas to flow into the transition piece 43. The air-fuel mixture is then mixed with fuel injected from the pilot nozzle 44, burned by being ignited by a pilot burner (not shown) so as to become combustion gas, and ejected into the transition piece 43. At this time, a part of the combustion gas is ejected to diffuse in a surrounding area in the transition piece 43 with flame, and the combustion gas is ignited by premixed gas flowing from the respective main fuel nozzles 45 into the transition piece 43 and burns. That is, flame-holding for performing stable combustion of lean premixed fuel from the main fuel nozzle 45 can be performed by diffused flame of the pilot fuel injected from the pilot nozzle 44. Further, airflow of high-temperature and high-pressure compressed air is taken in from the openings 64 and flows along the inner wall surfaces of the inner cylinder 42 and the transition piece 43 to be cooled. Accordingly, a temperature increase of the inner cylinder 42 and the transition piece 43 due to combustion gas can be suppressed.

As shown in FIGS. 1 to 3, in the combustor 12 according to the first embodiment configured as described above, three contraction members 71, 72, and 73 are arranged along a circumferential direction of the inner cylinder 42 on an inner wall surface in a downstream of a flow direction of combustion gas in the inner cylinder 42. The contraction members 71, 72, and 73 are provided in a predetermined area in the circumferential direction excluding penetrating portions 74, 75, and 76, which do not disturb the flow of film air (cooling air).

More specifically, the respective contraction members 71, 72, and 73 have substantially the same shape, with a cross section thereof being an L-shape. A base end of each of these contraction members is fixed to the inner wall surface of the inner cylinder 42 by welding (or a bolt) 77, and an apical end thereof is supported by a support member 78 with a predetermined gap from the inner wall surface of the inner cylinder 42. Therefore, in the respective contraction members 71, 72, and 73, a guide surface inclined by a predetermined angle θ is formed to cause film air flowing on the inner wall surface of the inner cylinder 42 to flow toward the central part of the inner cylinder 42. The contraction members 71, 72, and 73 respectively include corner portions 71a and 71b, 72a and 72b, 73a and 73b protruding toward the central part of the inner cylinder 42.

Meanwhile, the penetrating portions 74, 75, and 76 are positioned between the respective contraction members 71, 72, and 73, and have substantially the same shape. That is, the contraction members 71, 72, and 73 are provided through the penetrating portions 74, 75, and 76, namely, the contraction members 71, 72, and 73 and the penetrating portions 74, 75, and 76 are divided in plural (three in the present embodiment) in the circumferential direction, and are arranged alternately in the circumferential direction. In this case, the contraction members 71, 72, and 73 are provided at asymmetric positions with respect to the circumferential direction on the inner wall surface of the inner cylinder 42. However, the contraction members 71, 72, and 73 do not need to be provided at asymmetric positions in the circumferential direction and can be provided at symmetric positions.

Therefore, in the inner cylinder 42, combustion gas flows in the central part, and film air flows along the inner wall surface of the outer periphery. At this time, in the inner cylinder 42, in an area where the contraction members 71, 72, and 73 are provided, the flow of combustion gas is disturbed so that film air flows from the contraction members 71, 72, and 73 toward the central part. At the same time, the flow of cooling air flowing in from the downstream of the contraction members 71, 72, and 73 is disturbed by the contraction members 71, 72, and 73. Therefore, film air is mixed with high-temperature combustion gas to promote a combustion reaction, thereby suppressing generation of carbon monoxide and unburned hydrocarbon.

Furthermore, in the inner cylinder 42, film air and combustion gas are easily mixed with each other in the area where the contraction members 71, 72, and 73 are provided. On the other hand, in an area where the contraction members 71, 72, and 73 are not provided and only the penetrating portions 74, 75, and 76 are provided, the flow of film air is not disturbed and the film air flows along the inner wall surface. Therefore, abnormal combustion of unburned premixed gas is prevented, and the instability of swirl is avoided by the presence of the penetrating portions 74, 75, and 76, thereby suppressing generation of unstable combustion.

In this case, because the respective contraction members 71, 72, and 73 are divided in plural, and they include the corner portions 71a and 71b, 72a and 72b, 73a and 73b, respectively, film air, the flow of which has been disturbed by the contraction members 71, 72, and 73, also causes effects on film air passing through the penetrating portions 74, 75, and 76, and thus generation of carbon monoxide and unburned hydrocarbon and an increase in combustion gas temperature are effectively suppressed.

FIG. 4 is a graph representing a heat rate with respect to a distance from a base end to an apical end in the combustor 12. As shown in FIG. 4, in a conventional combustor in which any contraction member is not provided, as shown by the dotted line in FIG. 4, the heat rate becomes highest in the middle part. In a conventional combustor in which a contraction member in a ring shape is provided at a position L, as shown by the solid line in FIG. 4, the heat rate excessively increases immediately after the position of the contraction member. On the other hand, in the combustor 12 in which the contraction members 71, 72, and 73 according to the first embodiment are provided, as shown by the one-dot chain line in FIG. 4, the highest value of the heat rate is lower than that of the above conventional combustor.

Furthermore, the contraction members 71, 72, and 73 are provided at asymmetric positions with respect to the circumferential direction on the inner wall surface of the inner cylinder 42, the flame pattern becomes unbalanced with respect to the circumferential direction, and the length of a flame sheet in an axial direction in this portion changes. As a result, the temperature distribution in an area where the contraction members 71, 72, and 73 are provided and in an area where the penetrating portions 74, 75, and 76 are provided changes along with the circumferential direction, and an excitation force that generates unstable vibration in the axial direction of the combustor is reduced.

Meanwhile, because the flame has an asymmetrical distribution with respect to the circumferential direction, generation of a vibration mode in which "+" and "−" are inverted is suppressed in a vibration mode in the cross section.

In this case, the contraction members 71, 72, and 73 are provided at asymmetric positions in the circumferential direction. The asymmetric positions with respect to the circumferential direction are positions at which a diameter line (a node at which the phase is inverted) cannot be drawn in the vibration mode in which a cross section of the inner cylinder 42 is uniformly divided into even numbers. In this explanation, it is set at a position where the contraction members 71, 72, and 73 are not overlapped in the circumferential direction and are not in point symmetry with respect to the center of the inner cylinder 42. That is, in the present embodiment, the contraction members 71, 72, and 73 (the penetrating portions 74, 75, and 76) are set at positions away from each other by 120 degrees in the circumferential direction.

As described above, in the gas turbine combustor according to the first embodiment, the air passage 54 that supplies combustion high-pressure air, the pilot nozzle 44, the main fuel nozzle 45, and the top hat nozzle 47 that supply fuel, and the openings 64 that supplies film air (cooling air) are provided with respect to the inner cylinder 42. The contraction members 71, 72, and 73 are arranged along the circumferential direction on the inner wall surface in the downstream of the flow direction of combustion gas in the inner cylinder 42, and provided in a predetermined area in the circumferential direction excluding the penetrating portions 74, 75, and 76, which do not disturb the flow of film air.

Accordingly, in the inner cylinder 42, in the area where the contraction members 71, 72, and 73 are provided, the flow of film air is disturbed by the contraction members 71, 72, and 73 so that film air flows toward a central part. At the same time, the flow of cooling air flowing from the downstream of the contraction members 71, 72, and 73 is also disturbed by the contraction members 71, 72, and 73, and thus cooling air is mixed with high-temperature combustion gas, thereby enabling to promote a combustion reaction and to suppress generation of carbon monoxide and unburned hydrocarbon. On the other hand, in the area where the penetrating portions 74, 75, and 76 are provided, because the film air flows along the inner wall surface without being disturbed, abnormal combustion of unburned premixed gas can be prevented, and the instability of swirl can be avoided by the presence of the penetrating portions 74, 75, and 76. As a result, generation of unstable combustion can be suppressed.

In the gas turbine combustor according to the first embodiment, the contraction members 71, 72, and 73 are divided into three through the penetrating portions 74, 75, and 76 and arranged in the circumferential direction. Therefore, the gap between the contraction members 71, 72, and 73 and the penetrating portions 74, 75, and 76 becomes short, thereby enabling to prevent abnormal combustion of unburned premixed gas and to avoid the instability of swirl by the presence of the penetrating portions 74, 75, and 76.

In the gas turbine combustor according to the first embodiment, the contraction members 71, 72, and 73 are provided at the asymmetric positions with respect to the circumferential direction on the inner wall surface of the inner cylinder 42. Therefore, the flame pattern becomes unbalanced with respect to the circumferential direction, and the temperature distribution in the inner cylinder 42 changes along with the circumferential direction, thereby enabling to suppress generation of a vibration mode and to suppress generation of unstable combustion.

Furthermore, in the gas turbine combustor according to the first embodiment, the contraction members 71, 72, and 73 respectively include the corner portions 71a and 71b, 72a and 72b, and 73a and 73b protruding toward the central part of the combustion chamber. Accordingly, film air generates swirl at the corner portions 71a and 71b, 72a and 72b, and 73a and 73b of the contraction members 71, 72, and 73, thereby promoting mixing of combustion gas with cooling air.

In the first embodiment, the contraction members 71, 72, and 73 have the same shape and the penetrating portions 74, 75, and 76 also have the same shape, and these elements are arranged with an equal gap in the circumferential direction. However, these elements can be also arranged asymmetrically by changing the circumferential length of the contraction members 71, 72, and 73 and the penetrating portions 74, 75, and 76, by changing a protruding amount of the contraction members 71, 72, and 73 toward the central part, or by changing the gap in the circumferential direction.

Second Embodiment

Figure 6:
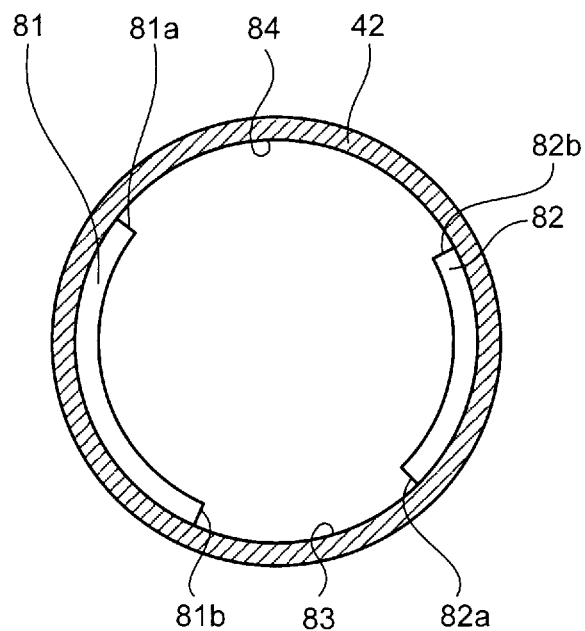
FIG. 6 is a schematic diagram of a cross section of a gas turbine combustor according to a second embodiment of the present invention.

FIG. 6 is a schematic diagram of a cross section of a gas turbine combustor according to a second embodiment of the present invention. Members having functions identical to those explained in the above embodiment are denoted by like reference signs and redundant explanations thereof will be omitted.

In the second embodiment, as shown in FIG. 6, contraction members 81 and 82 are arranged along a circumferential direction of the inner cylinder 42 on an inner wall surface in a downstream of a flow direction of combustion gas in the inner cylinder 42. The contraction members 81 and 82 are provided in a predetermined area in the circumferential direction excluding penetrating portions 83 and 84, which do not disturb the flow of film air (cooling air).

That is, the contraction members 81 and 82 respectively have a different length in the circumferential direction, and include corner portions 81a and 81b, 82a and 82b, respectively, that protrude toward a central part of the inner cylinder 42. On the other hand, the penetrating portions 83 and 84 are positioned between the respective contraction members 81 and 82, and have a different length in the circumferential direction. That is, the contraction members 81 and 82 are divided in plural through the penetrating portions 83 and 84 and arranged in the circumferential direction. In this case, the contraction members 81 and 82 and the penetrating portions 83 and 84 are provided at the asymmetric positions with respect to the circumferential direction on the inner wall surface of the inner cylinder 42.

Accordingly, in the inner cylinder 42, combustion gas flows in the central part, and film air flows along the inner wall surface of an outer periphery. At this time, in the inner cylinder 42, in an area where the contraction members 81 and 82 are provided, the flow of film air is disturbed by the contraction members 81 and 82 so that the film air flows toward the central part. Therefore, the film air is mixed with high-temperature combustion gas to promote a combustion reaction, thereby suppressing generation of carbon monoxide and unburned hydrocarbon.

In the inner cylinder 42, film air and combustion gas are easily mixed with each other in the area where the contraction members 81 and 82 are provided. On the other hand, in an area where the contraction members 81 and 82 are not provided and only the penetrating portions 83 and 84 are provided, the flow of film air is not disturbed and the film air flows along the inner wall surface. Therefore, abnormal combustion of unburned premixed gas is prevented, and the instability of swirl is avoided by the presence of the penetrating portions 83 and 84, thereby suppressing generation of unstable combustion.

Furthermore, the contraction members 81 and 82 and the penetrating portions 83 and 84 are provided asymmetrically with respect to the circumferential direction on the inner wall surface of the inner cylinder 42, a flame pattern becomes unbalanced with respect to the circumferential direction, and the length of a flame sheet in an axial direction in this portion changes. Therefore, the temperature distribution in the area where the contraction members 81 and 82 are provided and in the area where the penetrating portions 83 and 84 are provided changes along with the circumferential direction, and an excitation force that generates unstable vibration in the axial direction of the combustor is reduced.

As described above, in the gas turbine combustor according to the second embodiment, the two contraction members 81 and 82 are arranged along the circumferential direction on the inner wall surface of the inner cylinder 42 in the downstream of the flow direction of combustion gas, and the contraction members 81 and 82 are provided in a predetermined area in the circumferential direction excluding the penetrating portions 83 and 84, which do not disturb the flow of film air.

Accordingly, the flow of film air is disturbed by the contraction members 81 and 82 and film air is mixed with high-temperature combustion gas to promote a combustion reaction, thereby suppressing generation of carbon monoxide and unburned hydrocarbon. Meanwhile, abnormal combustion of unburned premixed gas is prevented by the penetrating portions 83 and 84, and the instability of swirl is avoided by the presence of the penetrating portions 83 and 84 to suppress generation of unstable combustion.

Third Embodiment

Figure 7:
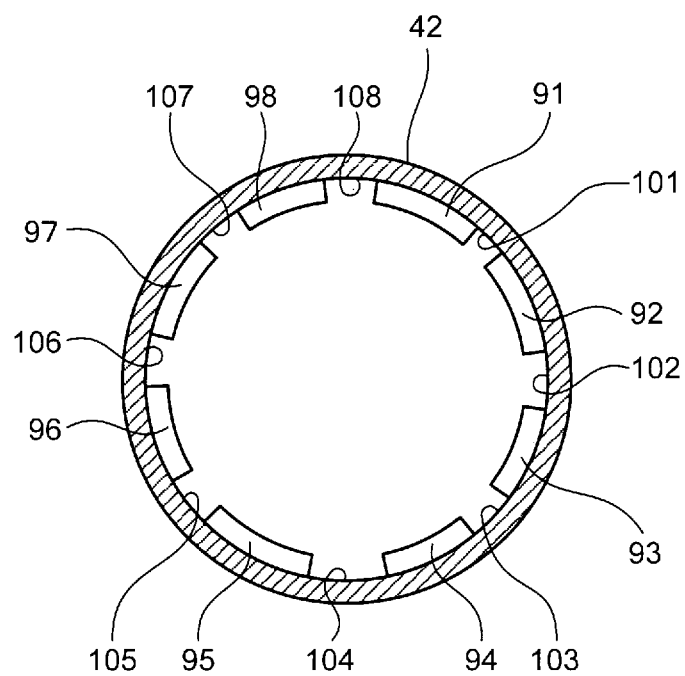
FIG. 7 is a schematic diagram of a cross section of a gas turbine combustor according to a third embodiment of the present invention.

FIG. 7 is a schematic diagram of a cross section of a gas turbine combustor according to a third embodiment of the present invention. Members having functions identical to those explained in the above embodiments are denoted by like reference signs and redundant explanations thereof will be omitted.

In the third embodiment, as shown in FIG. 7, contraction members 91 to 98 are arranged along a circumferential direction of the inner cylinder 42 on an inner wall surface in a downstream of a flow direction of combustion gas in the inner cylinder 42. The contraction members 91 to 98 are provided in a predetermined area in the circumferential direction excluding penetrating portions 101 to 108, which do not disturb the flow of film air (cooling air).

That is, the respective contraction members 91 to 98 have the same shape, the penetrating portions 101 to 108 also have the same shape, and these elements are provided with an equal gap in the circumferential direction. These elements can be provided at asymmetric positions with respect to the circumferential direction, by changing the shape, length, arrangement or the like as required.

Accordingly, in the inner cylinder 42, combustion gas flows in the central part, and film air flows along the inner wall surface of an outer periphery. At this time, in the inner cylinder 42, in an area where the contraction members 91 to 98 are provided, the flow of film air is disturbed by the contraction members 91 to 98 so that the film air flows toward the central part. Therefore, film air is mixed with high-temperature combustion gas to promote a combustion reaction, thereby suppressing generation of carbon monoxide and unburned hydrocarbon.

In the inner cylinder 42, film air and combustion gas are easily mixed with each other in the area where the contraction members 91 to 98 are provided. On the other hand, in an area where the contraction members 91 to 98 are not provided and only the penetrating portions 101 to 108 are provided, the flow of film air is not disturbed and the film air flows along the inner wall surface. Therefore, abnormal combustion of unburned premixed gas is prevented, and the instability of swirl is avoided by the presence of the penetrating portions 101 to 108, thereby suppressing generation of unstable combustion.

As described above, in the gas turbine combustor according to the third embodiment, the eight contraction members 91 to 98 are arranged along the circumferential direction on the inner wall surface of the inner cylinder 42 in the downstream of the flow direction of combustion gas, and the contraction members 91 to 98 are provided in a predetermined area in the circumferential direction excluding the penetrating portions 101 to 108, which do not disturb the flow of film air.

Accordingly, the flow of film air is disturbed by the contraction members 91 to 98 and film air is mixed with high-temperature combustion gas to promote a combustion reaction, thereby suppressing generation of carbon monoxide and unburned hydrocarbon. Meanwhile, abnormal combustion of unburned premixed gas is prevented by the penetrating portions 101 to 108, and the instability of swirl is avoided by the presence of the penetrating portions 101 to 108. As a result, generation of unstable combustion can be suppressed.

Fourth Embodiment

Figure 8:
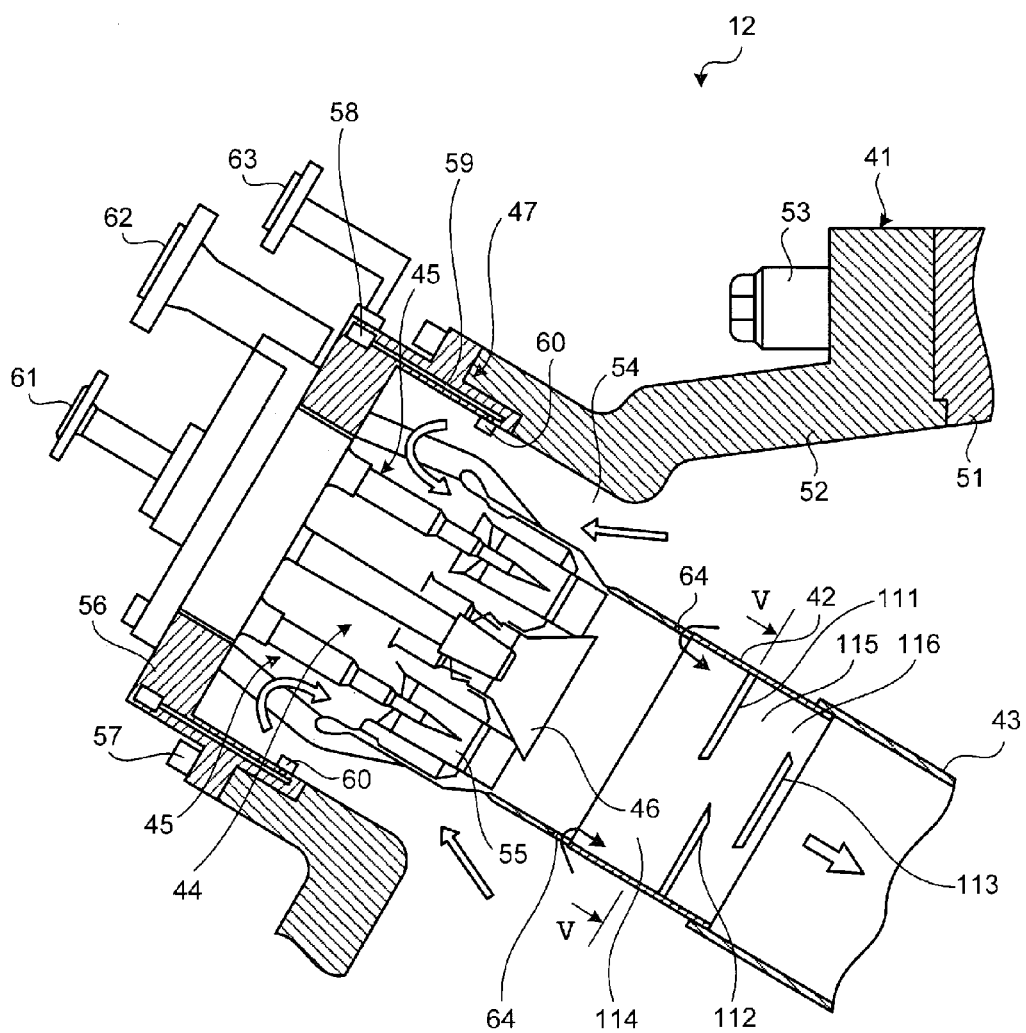
FIG. 8 is a schematic diagram of inside of a transition piece in a gas turbine combustor according to a fourth embodiment of the present invention.
Figure 9:
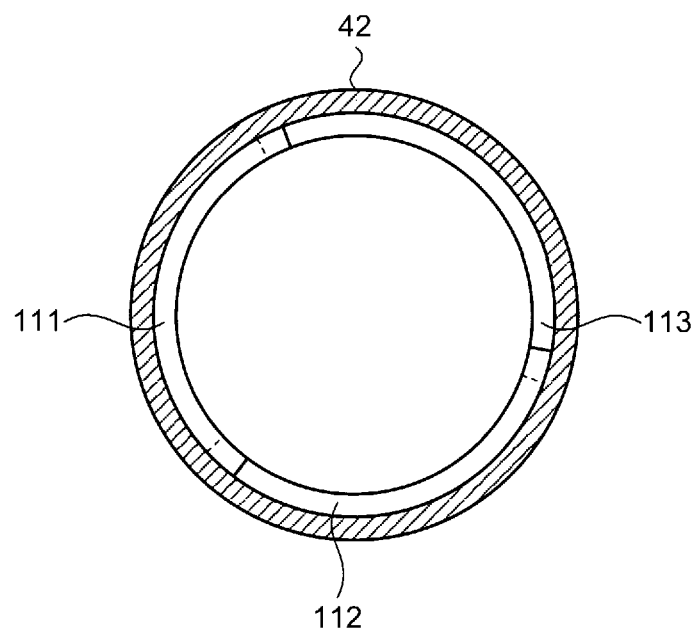
FIG. 9 is a cross-sectional view along a line IX-IX in FIG. 8.

FIG. 8 is a schematic diagram of inside of a transition piece in a gas turbine combustor according to a fourth embodiment of the present invention, and FIG. 9 is a cross-sectional view along a line IX-IX in FIG. 8. Members having functions identical to those explained in the above embodiments are denoted by like reference signs and redundant explanations thereof will be omitted.

In the fourth embodiment, as shown in FIGS. 8 and 9, three contraction members 111, 112, and 113 are arranged along a circumferential direction of the inner cylinder 42 on an inner wall surface in a downstream of a flow direction of combustion gas in the inner cylinder 42. The contraction members 111, 112, and 113 are provided in a predetermined area in the circumferential direction excluding penetrating portions 114, 115, and 116, which do not disturb the flow of film air (cooling air).

That is, the respective contraction members 111, 112, and 113 have substantially the same length in the circumferential direction, and are provided while being shifted in the flow direction of combustion gas, and are provided while also being shifted in the circumferential direction. In this case, the three contraction members 111, 112, and 113 are arranged so that a part thereof overlaps on each other with respect to the flow direction of combustion gas. On the other hand, the penetrating portions 114, 115, and 116 are shifted in the circumferential direction of the respective contraction members 111, 112, and 113 and positioned at the same position with respect to the flow direction of combustion gas, with the circumferential length thereof being substantially the same. In this case, the contraction members 111, 112, and 113 and the penetrating portions 114, 115, and 116 are provided at asymmetric positions with respect to the circumferential direction on the inner wall surface of the inner cylinder 42.

Accordingly, in the inner cylinder 42, combustion gas flows in the central part, and film air flows along the inner wall surface of an outer periphery. At this time, in the inner cylinder 42, in an area where the contraction members 111, 112, and 113 are provided, the flow of film air is disturbed by the contraction members 111, 112, and 113 so that the film air flows toward the central part. Therefore, film air is mixed with high-temperature combustion gas to promote a combustion reaction, thereby suppressing generation of carbon monoxide and unburned hydrocarbon.

In the inner cylinder 42, film air and combustion gas are easily mixed with each other in the area where the contraction members 111, 112, and 113 are provided. On the other hand, in an area where the contraction members 111, 112, and 113 are not provided and only the penetrating portions 114, 115, and 116 are provided, the flow of film air flows along the inner wall surface without being disturbed. Therefore, abnormal combustion of unburned premixed gas is prevented, and the instability of swirl is avoided by the presence of the penetrating portions 114, 115, and 116, thereby suppressing generation of unstable combustion.

Furthermore, the contraction members 111, 112, and 113 and the penetrating portions 114, 115, and 116 are provided asymmetrically with respect to the circumferential direction on the inner wall surface of the inner cylinder 42, a flame pattern becomes unbalanced with respect to the circumferential direction, and the length of a flame sheet in an axial direction in this portion changes. Therefore, the temperature distribution in the area where the contraction members 111, 112, and 113 are provided and in an area where the penetrating portions 114, 115, and 116 are provided changes along with the circumferential direction, and an excitation force that generates unstable vibration in the axial direction of the combustor is reduced.

As described above, in the gas turbine combustor according to the fourth embodiment, the three contraction members 111, 112, and 113 are arranged along the circumferential direction on the inner wall surface of the inner cylinder 42 in the downstream of the flow direction of combustion gas, and the contraction members 111, 112, and 113 are provided while being shifted in the circumferential direction and in the axial direction of the inner cylinder 42, and the contraction members 111, 112, and 113 are provided in a predetermined area in the circumferential direction excluding the penetrating portions 114, 115, and 116, which do not disturb the flow of film air.

Accordingly, the flow of film air is disturbed by the contraction members 111, 112, and 113 and film air is mixed with high-temperature combustion gas to promote a combustion reaction, thereby suppressing generation of carbon monoxide and unburned hydrocarbon. Meanwhile, abnormal combustion of unburned premixed gas is prevented by the penetrating portions 101 to 108, and the instability of swirl is avoided by the presence of the penetrating portions 114, 115, and 116 to suppress generation of unstable combustion.

In the respective embodiments described above, the contraction members are configured to have a shape with corner portions protruding toward the central part of the combustion chamber; however, the shape of the contraction member is not limited thereto. For example, a semicircular board can be fixed to the inner wall surface of the combustion chamber, and the contraction member does not particularly need to have a shape having corner portions. Furthermore, the position at which the contraction member is arranged is not limited to the inner cylinder 42 positioned immediately below the respective nozzles 44, 45, and 47, and the contraction member can be provided in the transition piece 43, and the arrangement is not limited to be symmetrical and asymmetrical.

INDUSTRIAL APPLICABILITY

According to the gas turbine combustor and gas turbine of the present invention, a contraction member is provided in a predetermined area in a circumferential direction excluding penetrating portions, which do not disturb the flow of cooling air, thereby enabling to suppress generation of carbon monoxide and the like and to suppress generation of unstable combustion. Accordingly, the gas turbine combustor and the gas turbine can be also applied to any types of combustors and gas turbines.

REFERENCE SIGNS LIST 11 compressor
12 combustor (gas turbine combustor)
13 turbine
41 outer casing
42 inner cylinder
43 transition piece
44 pilot nozzle (fuel supplying unit)
45 main fuel nozzle (fuel supplying unit)
47 top hat nozzle (fuel supplying unit)
54 air passage (combustion high-pressure-air supplying unit)
64 opening (cooling-air supplying unit)
71, 72, 73, 81, 82, 91 to 98, 111, 112, 113 contraction member
71a, 71b, 72a, 72b, 73a, 73b, 81a, 81b, 82a, and 82b corner portion
74, 75, 76, 83, 84, 101 to 108, 114, 115, 116 penetrating portion

The invention claimed is:

1. A gas turbine combustor comprising:
a combustion chamber in which a combustion air and fuel are burned to generate combustion gas;
a combustion air supplying unit that supplies the combustion air to the combustion chamber;
a fuel supplying unit that supplies the fuel to the combustion air in the combustion chamber;
a cooling-air supplying unit that supplies a cooling air to the combustion chamber along an inner wall surface thereof; and
a contraction member arranged along a circumferential direction on the inner wall surface in a downstream of a flow direction of combustion gas in the combustion chamber, wherein
the contraction member is provided in a predetermined area in the circumferential direction excluding penetrating portions, which do not disturb flow of the cooling air,
the contraction member obliquity extends from the inner wall surface of the combustor chamber toward the downstream at a predetermined angle between the contraction member and the inner wall surface,
the cooling-air supplying unit includes an opening which is formed in the combustion chamber at a portion inside the contraction member in a radial direction of the combustion chamber and through which the cooling air is supplied, and
an end portion of the contraction member is supported by a support member to have a predetermined gap from the inner wall surface, such that a downstream side of a space between the contraction member and the inner wall surface forms an open end.

2. The gas turbine combustor according to claim 1, wherein the contraction member is divided in plural through the penetrating portions and arranged in the circumferential direction.

3. The gas turbine combustor according to claim 1, wherein the contraction members are provided at asymmetric positions with respect to the circumferential direction on the inner wall surface of the combustion chamber.

4. The gas turbine combustor according to claim 1, wherein the contraction member has a corner portion protruding toward a central part of the combustion chamber.

5. The gas turbine combustor according to claim 1, wherein the contraction member is provided in plural in the flow direction of combustion gas.

6. A gas turbine that supplies fuel to a combustion air compressed by a compressor to burn fuel in a combustor, and supplies generated combustion gas to a turbine to obtain rotational power, wherein
the combustor includes
a combustion chamber,
a combustion air supplying unit that supplies the combustion air to the combustion chamber,
a fuel supplying unit that supplies fuel to the combustion air in the combustion chamber,
a cooling-air supplying unit that supplies a cooling air to the combustion chamber along an inner wall surface thereof, and
a contraction member arranged along a circumferential direction on the inner wall surface in a downstream of a flow direction of combustion gas in the combustion chamber, wherein
the contraction member is provided in a predetermined area in the combustion circumferential direction excluding penetrating portions, which do not disturb flow of the cooling air, and
the contraction member obliquity extends from the inner wall surface of the combustor chamber toward the downstream at a predetermined angle between the contraction member and the inner wall surface,
the cooling-air supplying unit includes an opening which is formed in the combustion chamber at a portion inside the contraction member in a radial direction of the combustion chamber and through which the cooling air is supplied, and
an end portion of the contraction member is supported by a support member to have a predetermined gap from the inner wall surface, such that a downstream side of a space between the contraction member and the inner wall surface forms an open end.

* * * * *